United States Patent
Strand

(10) Patent No.: US 10,710,181 B2
(45) Date of Patent: Jul. 14, 2020

(54) SAW BLADE FOR CIRCULAR SAW AND USE OF SUCH SAW BLADE IN A BRUSH CUTTER

(71) Applicant: Swedex AB, Mjölby (SE)

(72) Inventor: Åke Strand, Mjölby (SE)

(73) Assignee: Swedex AB, Mjolby (SE)

( * ) Notice: Subject to any disclaimer, the term of this patent is extended or adjusted under 35 U.S.C. 154(b) by 0 days.

(21) Appl. No.: 16/196,103

(22) Filed: Nov. 20, 2018

(65) Prior Publication Data
US 2019/0151970 A1  May 23, 2019

(30) Foreign Application Priority Data

Nov. 22, 2017 (SE) ........................ 1751439

(51) Int. Cl.
*B23D 61/02* (2006.01)
*B27B 33/08* (2006.01)
(Continued)

(52) U.S. Cl.
CPC ............ *B23D 61/02* (2013.01); *B23D 45/16* (2013.01); *B27B 33/08* (2013.01); *B23D 45/003* (2013.01); *B23D 61/021* (2013.01)

(58) Field of Classification Search
CPC .... Y10T 83/9319–9367; B23D 61/121; B23D 61/021; B23D 61/02; B27B 33/08
(Continued)

(56) References Cited

U.S. PATENT DOCUMENTS 2,829,684 A * 4/1958 Lagerstrom ............. B27B 33/10
83/852
4,250,622 A 2/1981 Houle
(Continued)

FOREIGN PATENT DOCUMENTS

DE 20020731 U1 3/2001
EP 0192872 A1 9/1986
(Continued)

OTHER PUBLICATIONS

"Cleaning Saw Blade/Carbide Brush Cutter Blade European Style for Cutting Grass/Woods"; Hangzhou Yeyi Metals & Tools Co., Ltd.; https://detail.en.china.cn/provide/p149798452.html.

*Primary Examiner* — Laura M Lee
(74) *Attorney, Agent, or Firm* — Nexsen Pruet, PLLC; E. Eric Mills

(57) ABSTRACT

A saw blade (10) comprises a generally circular blade base body (100), and a plurality of teeth (101a, 101b), extending radially from the base body (100). The teeth (101a, 101b) are alternatingly set towards opposing axial (A) directions of the saw blade, such that each tooth presents a respective tooth plane, which is angled relative to a base body plane. The teeth (101a, 101b) present a respective first cutting edge (102a, 102b), extending along a radially distal edge portion (103) of the respective tooth, along a length of the tooth, as seen in a direction of rotation of the saw blade. The radially distal edge portion (103) presents a first bevel (104), providing a first bevel surface (105) which is non-perpendicular relative to the tooth plane. The radially distal edge portion (103) presents, at a radially outermost portion thereof, a hard portion (106) having greater hardness than the base body (100).

The saw blade can be used in a brush cutter.

18 Claims, 4 Drawing Sheets

(51) Int. Cl.
  *B23D 45/16* (2006.01)
  *B23D 45/00* (2006.01)

(58) Field of Classification Search
  USPC .................................................. 83/835–855
  See application file for complete search history.

(56) References Cited

U.S. PATENT DOCUMENTS

| | | | |
|---|---|---|---|
| 4,563,929 A | 1/1986 | Ringlee et al. | |
| 4,690,024 A * | 9/1987 | Chaconas | B23D 61/02 76/112 |
| 5,085,113 A | 2/1992 | Pinney | |
| 5,331,876 A | 7/1994 | Hayden, Sr. | |
| 5,351,595 A | 10/1994 | Johnston | |
| 5,427,000 A * | 6/1995 | Hellbergh | B21K 5/12 76/112 |
| 5,569,257 A * | 10/1996 | Arnegger | B23D 61/006 30/350 |
| 5,875,700 A | 3/1999 | Powell | |
| 7,882,774 B1 | 2/2011 | Bernardy | |
| 9,981,329 B2 * | 5/2018 | Tani | B23D 61/04 |
| 2006/0065098 A1 * | 3/2006 | Cranna | B23D 61/121 83/661 |
| 2006/0225553 A1 * | 10/2006 | Hasegawa | B23D 61/04 83/835 |
| 2009/0217794 A1 * | 9/2009 | Maietta | B27L 11/005 83/884 |
| 2010/0122620 A1 * | 5/2010 | Ruthven | B23D 61/026 83/835 |
| 2010/0126326 A1 * | 5/2010 | Cloutier | B23D 61/04 83/835 |
| 2015/0190871 A1 | 7/2015 | Dexter | |
| 2016/0082534 A1 * | 3/2016 | Fujiwara | B23D 61/028 |

FOREIGN PATENT DOCUMENTS

| | | | |
|---|---|---|---|
| EP | 2801431 A1 | 4/2014 | |
| JP | 40567220 U | 9/1993 | |
| JP | D6253642 | 9/1994 | |
| SE | 5096072 C2 | 1/1994 | |
| WO | WO-9932251 A1 * | 7/1999 | ........... B23D 61/121 |
| WO | WO-2018194511 A1 * | 10/2018 | ............ B23D 65/00 |

\* cited by examiner

SAW BLADE FOR CIRCULAR SAW AND USE OF SUCH SAW BLADE IN A BRUSH CUTTER

TECHNICAL FIELD

The present disclosure relates to a saw blade for use in circular saws, in particular for cutting wood. A particular application includes devices for cutting fresh wood or live trees, plants or bushes, such as in brush cutters.

BACKGROUND

Brush cutters are well known as such. There are many different types of cutting arrangements that can be used for brush cutters, such as flexible wires (made of plastic or metal), essentially straight blades, various three- or four pointed star-shaped cutters and cutters having the general appearance of a circular saw blade.

The present disclosure relates to the latter category of brush cutter saw blades.

During operation, the saw blade becomes worn, whereby, inter alia, cutting edges on the saw blade become dulled. Hence, it is necessary to re-establish the cutting edges, in order to maintain productivity, and in some cases to enable continued cutting operation. One option is re-sharpening. Such re-sharpening is often done manually, using a sharpening tool, such as a rasp, which can be made of a metallic material having greater hardness than the saw blade.

However, the re-sharpening operation is difficult and time-consuming, as every tooth on the saw blade must be sharpened individually, as a separate step.

It is not uncommon for circular saw blades used in brush cutters to require re-sharpening every 1-3 hours, i.e. 3-8 times a day during a normal working day, which translates into a substantial amount of downtime if re-sharpening is done every time a saw blade becomes dull, or the need to carry a large number of replacement saw blades and to replace saw blades many times every day.

Hence, there is a need for solutions which increase the uptime of a saw blade.

SUMMARY

It is an object of the present disclosure to provide a saw blade having increased uptime, and in particular a saw blade that is suitable for cutting wood and in particular for applications such as brush cutters.

The invention is defined by the appended independent claim, with embodiments being set forth in the appended dependent claims, in the following description and in the drawings.

According to a first aspect, there is provided a saw blade, comprising a generally circular blade base body, and a plurality of teeth, extending radially from the base body. The teeth are alternatingly set towards opposing axial directions of the saw blade, such that each tooth presents a respective tooth plane, which is angled relative to a base body plane. The teeth present a respective first cutting edge, extending along a radially distal edge portion of the respective tooth, along a length of the tooth, as seen in a direction of rotation of the saw blade. The radially distal edge portion presents a first bevel, providing a first bevel surface which is non-perpendicular relative to the tooth plane. The radially distal edge portion presents, at a radially outermost portion thereof, a hard portion having greater hardness than the base body.

In the present context, the tooth is defined as that portion of the saw blade which extends beyond the innermost part of a radial recess of the saw blade.

In tests performed by the present applicant, such saw blades have proven to provide an increase in uptime to about 25-36 hours before re-sharpening, which represents an improvement on the order of 1220-2440% compared to the best prior art blades known to the applicant.

The hard portion present a hardness of 45-75 HRC, preferably 55-65 HRC.

The hard portion comprises a radially outermost portion of the tooth.

The hard portion extends more than 0.05 mm and less than 1.5 mm, preferably less than 1 mm or less than 0.5 mm, radially inwardly from the radially distal edge of the tooth.

The first bevel surface, in a plane comprising a geometric rotational axis of the saw blade, extends at an angle of 0-70 degrees relative to the rotational axis, preferably 2-40 degrees or 5-30 degrees.

The hard portion may extend over at least 90%, preferably at least 95% or at least 99%, of a thickness of the tooth, as seen in the axial direction (A).

Hence, the first bevel surface may extend over the entire thickness of the tooth, such that the outermost portion of each tooth presents a single bevel surface, as seen in cross section, intersecting one of the tooth axial faces at a sharp angle and the other one at an obtuse angle.

The first bevel surface may be surface hardened and/or surface coated by a hard material.

In the case where the hard portion is formed by a hardened material portion, this may extend to a depth of 0.05-1 mm, preferably 0.10-0.45 mm or 0.15-0.35 mm, as seen in a direction normal of the first bevel surface.

In the case where the hard portion is formed by a surface coating, this may extend to a thickness of 0.001-0.3 mm, preferably 0.01-0.3 mm or 0.1-0.2 mm, as seen in a direction normal of the first bevel surface.

Alternatively, the hard portion may be formed by a hardened material portion, which may extend over less than 60%, preferably less than 50%, of a thickness of the tooth, as seen in the axial direction.

The extent in the axial direction may be 0.1-1.3 mm, preferably 0.35-0.65 mm or 0.45-0.55 mm.

The hard portion may extend to a depth of 0.05-1 mm, preferably 0.10-0.45 mm or 0.15-0.35 mm, as seen in the radial direction of the saw blade.

According to another alternative, the radially distal edge portion may present a second bevel, providing a second bevel surface, which, as seen in said plane comprising the geometric rotational axis of the saw blade, forms an obtuse angle with the first bevel surface.

The obtuse angle may be situated at a radially outermost portion of the tooth.

The second bevel surface may be non-perpendicular relative to the tooth plane.

The second bevel surface may, in a plane comprising a geometric rotational axis of the saw blade, extend at an angle of 0-70 degrees relative to the rotational axis, preferably 0-40 degrees or 2-15 degrees.

The hard portion may be formed by a hardened material portion, to a depth of 0.1-0.5 mm, preferably 0.15-0.45 mm or 0.25-0.35 mm, as seen in a direction normal of the second bevel surface.

The hard portion may extend over less than 60%, preferably less than 50%, of a thickness of the tooth, as seen in the axial direction.

The extent of the second bevel surface in the axial direction may be 0.1-1.3 mm, preferably 0.35-0.65 mm or 0.45-0.55 mm.

The blade base body may present a thickness of 1.1-1.8 mm, preferably 1.2-1.6 mm, 1.5-1.6 mm or 1.2-1.3 mm.

The base body may be formed of a planar metal sheet having uniform thickness, with due allowance for manufacturing tolerances. Typically, saw blades for ICE powered brush cutters may have a thickness of 1.5-1.8 mm, preferably 1.5-1.6 mm and saw blades for electrically powered brush cutters may have a thickness of 1.1-1.8 mm, preferably 1.2-1.3 mm.

An axially outermost portion of each tooth may be axially set by 0.6-1.4 mm, preferably 0.6-1.3, 0.7-1.2, 0.9-1.3 mm or 0.8-0.9 mm from a corresponding surface of the base body.

Typically, saw blades for ICE powered brush cutters may have a tooth set of 0.7-1.4 mm, preferably 0.9-1.3 mm and saw blades for electrically powered brush cutters may have a thickness of 0.6-1.2 mm, preferably 0.8-0.9 mm.

The blade base body may present a hardness of 35-45 HRC, preferably 42-44 HRC.

The teeth and the blade base body may be integrated with each other, preferably formed in one piece.

Each pair of adjacent teeth may be separated, in the rotational direction of the saw blade, by a chip space.

Each cutting edge may present a tooth radius, which increases continuously from a first chip space to a second, adjacent chip space.

The chip space may be undercut relative to the cutting edge, at a transition between the tooth's maximum tooth radius and the chip space.

The saw blade may further comprise a chip breaker, for deflecting and/or breaking chips entering the chip space.

The saw blade may further comprise a chip limiter for preventing or reducing work piece penetration radially into the chip space.

The tooth's maximum tooth radius may be greater than a maximum chip limiter radius, preferably by 0.4-1 mm, more preferably by 0.5-0.7 mm.

A line between two spaced apart points on one of the cutting edges may exhibit an angle of 4-10 degrees, preferably 5-9 degrees, 6-8 degrees or about 7 degrees, relative to a radius of the saw blade, taken at a center of said line.

Preferably, the two points may be positioned at respective end points of the first cutting edge, the end points being spaced apart in the direction of rotation.

A total diameter of the saw blade may be 150-300 mm, preferably 200-250 mm or 200-225 mm.

The teeth may extend 5-15 mm, preferably 8-12 mm, radially.

According to a second aspect, there is provided use of a saw blade as described above, in a brush cutter.

DETAILED DESCRIPTION

In the present disclosure, the invention is described with reference to a brush cutter, and to the use in such a brush cutter. It is understood, however, that other uses are not excluded, such as, but not limited to, in stationary or portable circular saws, and in particular for applications including the cutting of wood.

Figure 1A:
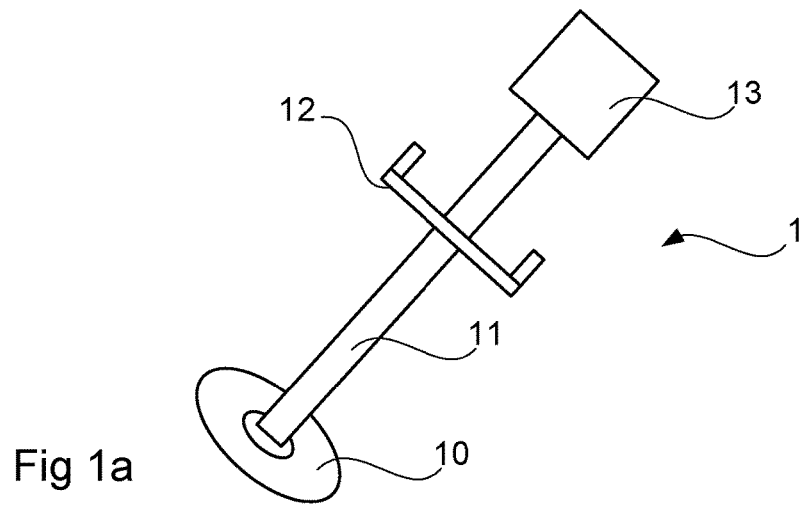
FIGS. 1a-1c show various aspects of a brush cutter and a saw blade for a brush cutter.

FIG. 1a schematically illustrates a brush cutter 1, comprising a saw blade 10, a frame 11, a handle 12 and a drive unit 13. The brush cutter is typically connected to the user by a harness worn by the user, such that the weight of the machine is transferred to the user's shoulders. The saw blade 10 is arranged at one end of the elongate frame 11 and the drive unit 13 is often arranged at the other end of the elongate frame 11, such that the weight of the saw blade 10, the saw blade connector and the forward part of the frame 11 are balanced by the drive unit 13.

The drive unit 13 may comprise an internal combustion engine, typically petrol powered, or an electric motor, which may be powered by battery or via a cord connected to a power grid or to a power generator.

Figure 1B:
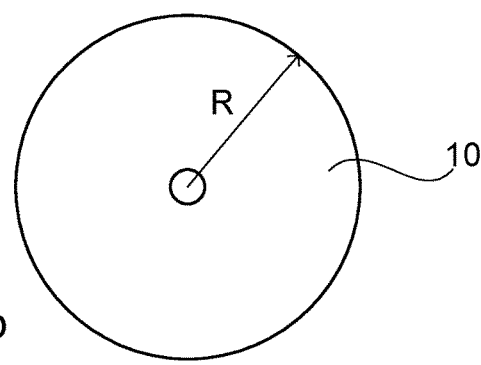

FIG. 1b schematically illustrates the saw blade 10 in a side view, defining the radial direction R.

Figure 1C:
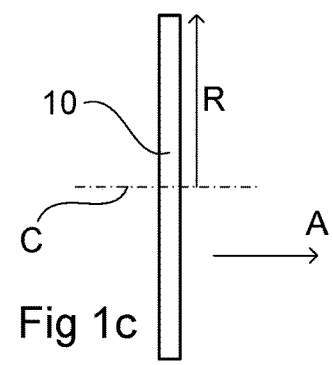

FIG. 1c schematically illustrates the saw blade 10 in sectional view, defining the axis of rotation C, about which the saw blade is to rotate, the radial direction R and the axial direction A, which is parallel with the axis of rotation and perpendicular to the radial direction R.

Figure 2A:
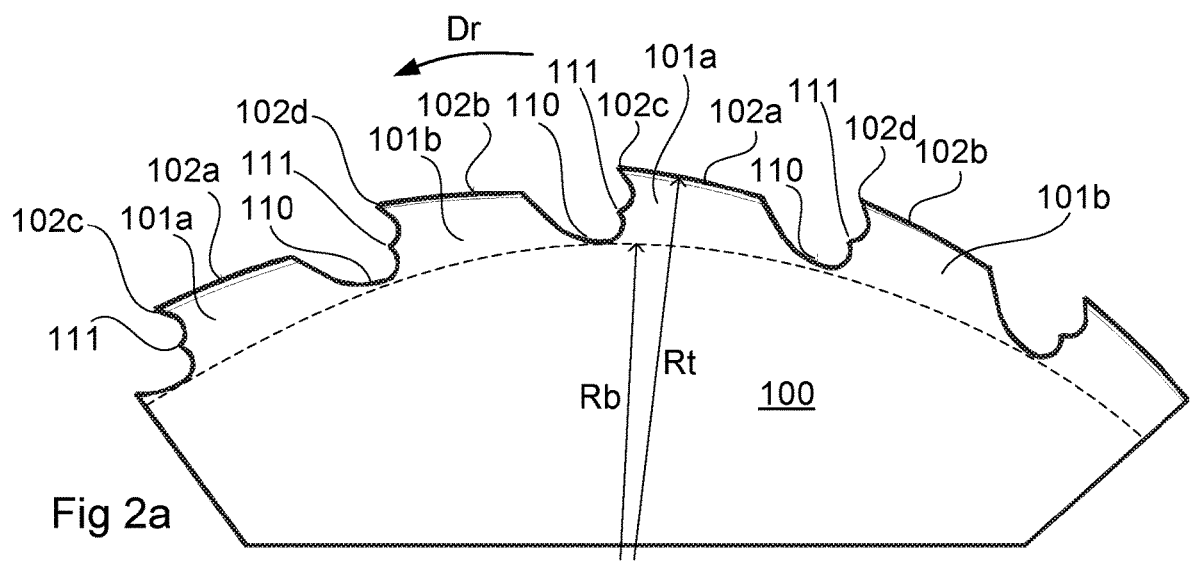
FIGS. 2a-2b schematically illustrate partial view of a saw blade according to the present invention.

FIG. 2a schematically illustrates a portion of a saw blade 10 as seen in a side view. The saw blade has a blade base body 100, a plurality of teeth 101a, 101b, which are spaced apart, as seen in a direction Dr of rotation of the saw blade 10, by radial recesses forming chip spaces 110.

Each tooth 101a, 101b presents a respective first cutting edge 102a, 102b, providing a radially outermost edge of the tooth 101a, 101b. A second cutting edge, or cutting tip, 102c, 102d is provided at the tip of the tooth where it meets the chip space 110, where the tooth 101a, 101b has its greatest radial extent. With regard to the direction of rotation Dr of the saw blade, this second cutting edge 102c, 102d is typically a leading cutting edge of the tooth 101a, 101b.

The chip spaces 110 may be provided with chip breakers 111, designed to ensure that chips formed by the cutting edge are broken off.

FIG. 2a also illustrates the radius Rb of the base body, which may be defined as the radius of the entire body that is inside the innermost part of the teeth. This part of the body is typically planar and circular. Optionally the base body 100 may be locally modified with respect to out of plane shape and/or thickness at its center, to provide a suitable connection to a hub.

FIG. 2a also illustrates the tooth radius Rt, which is the radius to the outermost portion of the teeth. As can be seen in FIG. 2a, this radius may vary along the length of the tooth, as seen in the direction Dr of rotation of the saw blade.

Figure 2B:
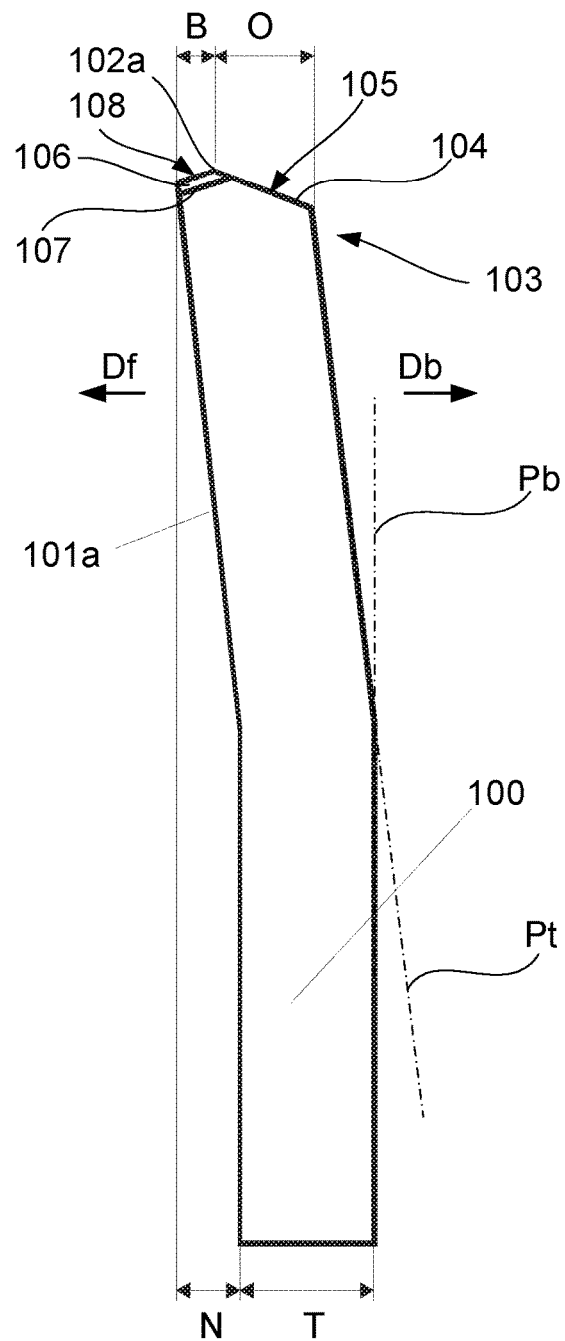

FIG. 2b schematically illustrates a portion of the saw blade 10 as seen in a cross sectional view. The base body 100 has a thickness T, measured along the axial direction A (FIG. 1c).

As can be seen in FIG. 2b, the tooth 101a is set relative to the base body 100. The setting is measured as an axial distance N by which the axially extreme portion of the outermost portion of the tooth 101a is offset from the surface facing the direction Df towards the tooth is set. Hence, a tooth plane Pt will be non-parallel with a base body plane Pb.

The teeth 101a, 101b are alternatingly set towards opposing axial directions. Adjacent teeth 101a, 101b may be set by the same axial distance N, or by different axial distances.

The edge portion 103 of the tooth 101a presents a first bevel 104, which provides a first bevel surface 105. The first bevel surface has an extent O, as measured along the axial direction A.

The first bevel surface 105 is non-perpendicular to the tooth plane Pt.

The edge portion 103 also has a cutting edge 102a, which is formed at the radially outermost portion of the tooth 101a.

The cutting edge 102a comprises a hard portion 106, which has an extent B, as measured along the axial direction. The hard portion 106 has greater hardness than the material of the blade base body 100.

The remainder of the tooth 101a, 101b, and preferably also of the blade base body 100, may be annealed or hardened, but in any case, not as hard as the hard portion 106. In particular, the portion of the blade base body 100 where the tooth planes Pt and the base body plane Pb meet should be annealed, but not as hard as the hard portion 106, so as to reduce the risk of cracks forming.

The edge portion 103 may further comprise a second bevel 107, which may provide a second bevel surface 108.

The second bevel surface 108 may, but need not, be non-perpendicular to the tooth plane Pt.

The first and second bevel surfaces 105, 108 may, when seen in a plane that contains the geometric rotational axis C (FIG. 2b) of the saw blade, be non-parallel, and thus meet at an angle. The bevel surfaces 105, 108 may be planar as seen in this plane.

Figure 3:
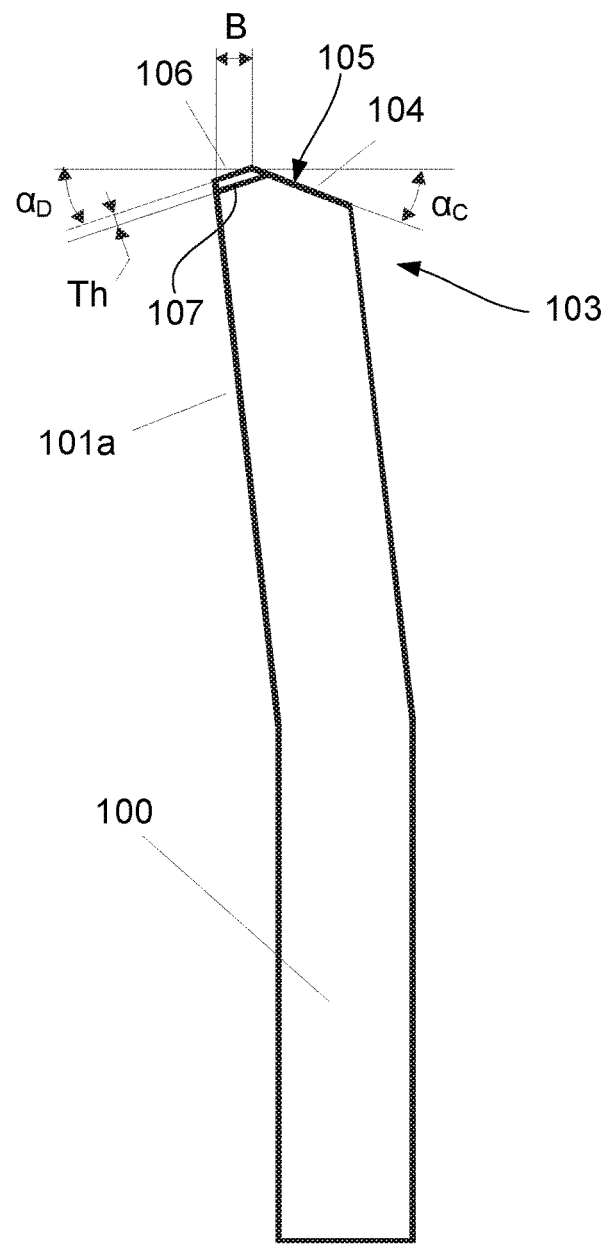
FIG. 3 schematically illustrate a partial sectional view of a saw blade according to a first embodiment.

Referring to FIG. 3, a first design of a saw blade 10 will be described. In this embodiment, the outermost portion 103 of the tooth comprises a first bevel 104 and a second bevel 107.

The first bevel surface 105 may be non-perpendicular to the tooth plane Pt.

The hard portion 106 may be provided to cover all of a second bevel surface 108. Some, but typically less than 10%, preferably less than 5% or less than 1%, of the first bevel surface 105 may be formed of the hard portion 106.

The hard portion extends in a direction normal to the second bevel surface 108 provided by the second bevel 107, to a depth Th of 0.1-0.5 mm, preferably 0.15-0.45 mm or 0.25-0.35 mm. In tested embodiments a thickness Th of 0.3 has been found suitable.

The hard portion has a hardness of 45-75 HRC, preferably 55-65 HRC, which may be provided, as a non-limiting example, by laser hardening.

The hard portion 106, and thus also the second bevel surface 108, may present an extent B of 0.1-1.3 mm in the axial direction A of the saw blade, preferably 0.35-0.65 mm or 0.45-0.55 mm. Hence, the hard portion may extend over less than 60% of a tooth thickness, as seen in the axial direction A, preferably over less than 50% or less than 40% of said tooth thickness.

Hence, the extent B may be on the order of 5-90% of the thickness T of the tooth 101a, 101b. Preferably, the extent B may be on the order of 8-60% of the thickness T, and in most cases on the order of 18-50% of the thickness T.

An angle $\alpha_C$ of the first bevel surface 105 relative to the axial direction A (i.e. the geometric axis of rotation C) of 0-70 degrees, preferably 2-40 degrees or 5-30 degrees. That is, preferably, the angle $\alpha_C$ of the first bevel surface 105 is a sharp angle.

The angle $\alpha_D$ of the second bevel surface 108 to the axial direction A (i.e. the geometric axis of rotation C) of 0-70 degrees, preferably 0-40 degrees or 2-15 degrees. That is, preferably, the angle $\alpha_D$ of the second bevel surface 108 is a sharp angle.

The sum of the angles $\alpha_C$ and $\alpha_D$ may be less than 90 degrees, preferably less than 80 degrees or less than 70 degrees, such that the resulting angle between the bevel surfaces 105, 108, which is formed at the radially outermost part of the tooth 101a, 101b is obtuse.

The first and second bevel surfaces 105, 108 may be non-parallel.

The second bevel surface 108 may be non-perpendicular to the tooth plane Pt.

The saw blade illustrated in sectional view in FIG. 3 may, when seen in side view, be designed as illustrated and described with reference to FIG. 2a or as illustrated and described with reference to FIG. 6.

Figure 4:
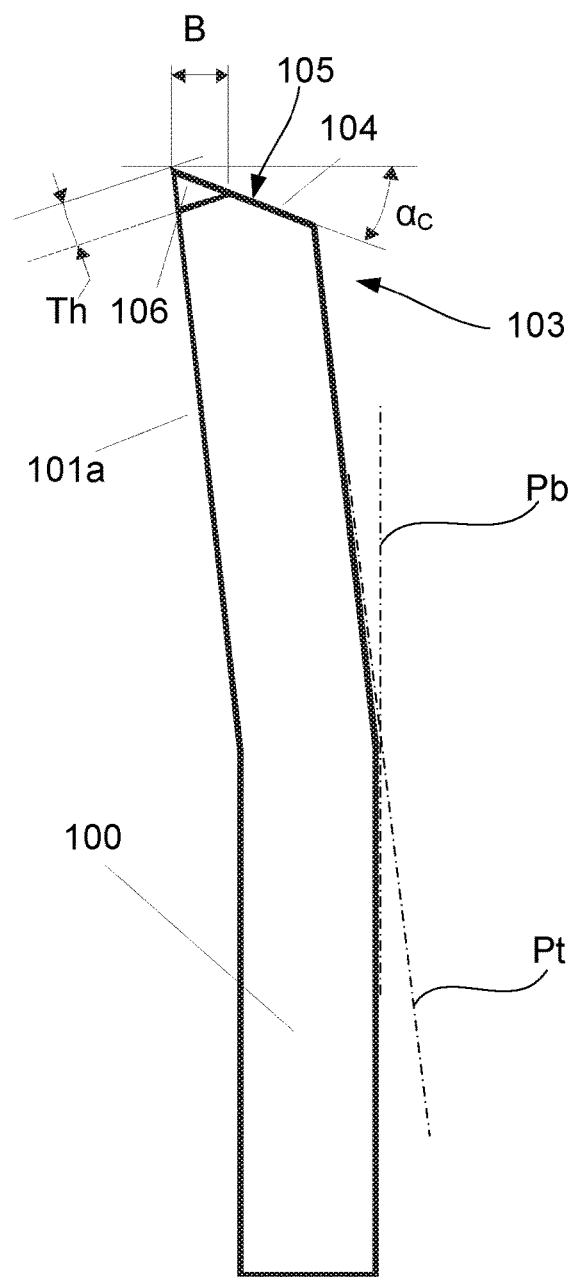
FIG. 4 schematically illustrate a partial sectional view of a saw blade according to a second embodiment.

Referring to FIG. 4, a second design of a saw blade will be described. In this embodiment, the outermost portion 103 of the tooth comprises a single bevel 104 providing a single bevel surface 105.

The bevel surface 105 may be non-perpendicular to the tooth plane Pt.

The bevel surface 105 extends throughout the thickness of the tooth, i.e. all the way from a first tooth axial face to a second, opposing, tooth axial face.

The bevel surface 105 may present a cross section, which, when seen in the plane that contains the geometric rotational axis C of the saw blade, is substantially straight.

The bevel surface may be planar as seen in this plane. Hence, the bevel surface 105 may intersect one of the tooth axial faces at a sharp angle $\alpha_C$, i.e. an angle less than 90 degrees, and may intersect the other, opposing, tooth axial face at an obtuse angle, i.e. an angle more than 90 degrees. The sharp angle $\alpha_C$ may be positioned at the axially distal portion of the saw blade, i.e. towards the direction Df to which the tooth 101a has been set.

The sharp angle $\alpha_C$ may also form the radially outermost part of the tooth 101a.

The angle $\alpha_C$ between the bevel surface 105 relative to the axial direction A (i.e. the geometric axis of rotation C) may be 0-70 degrees, preferably 2-40 degrees or 5-30 degrees.

At this outermost part of the tooth 101a, the hard portion 106 may be provided. The hard portion 106 may have a thickness Th as seen in the radial direction, which may be on the order of 0.05-1 mm, preferably 0.10-0.45 mm or 0.15-0.35 mm.

The hard portion 106, may present an extent B of 0.1-1.3 mm in the axial direction A of the saw blade, preferably 0.35-0.65 mm or 0.45-0.55 mm. Hence, the hard portion may extend over less than 60% of a tooth thickness, as seen in the axial direction A, preferably over less than 50% or less than 40% of said tooth thickness T.

The saw blade illustrated in sectional view in FIG. 4 may, when seen in side view, be designed as illustrated and described with reference to FIG. 2a or as illustrated and described with reference to FIG. 6.

Figure 5:
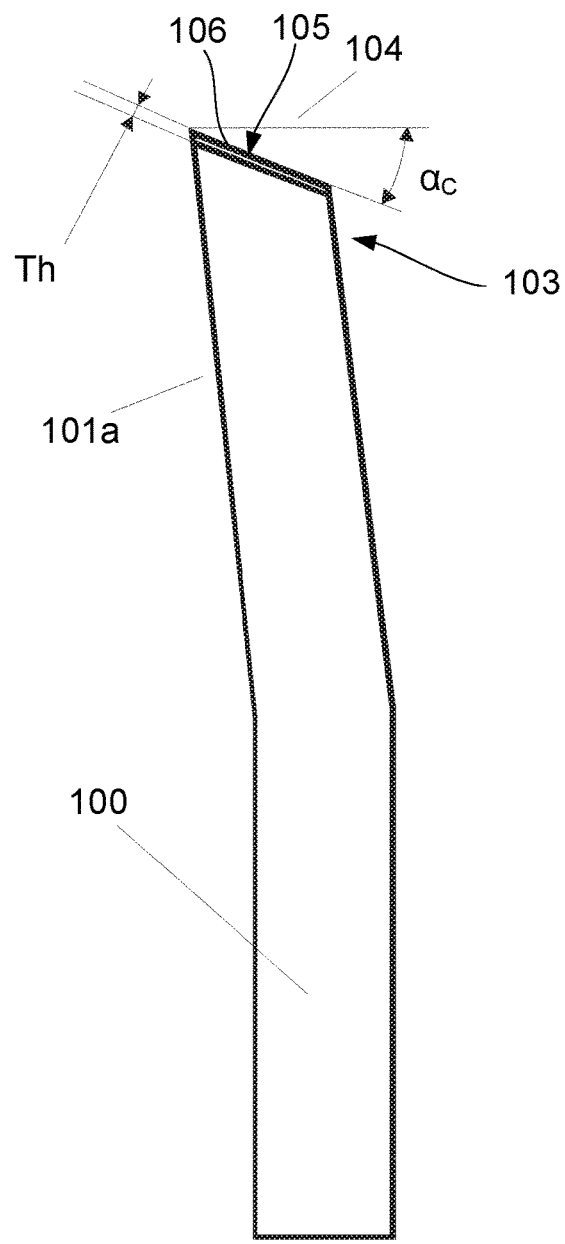
FIG. 5 schematically illustrate a partial sectional view of a saw blade according to a third embodiment.

Referring to FIG. 5, a third design of a saw blade will be described.

In this embodiment, the outermost portion 103 of the tooth comprises a single bevel 104 providing a single bevel surface 105.

The bevel surface 105 may be non-perpendicular to the tooth plane Pt.

The bevel surface 105 extends throughout the thickness of the tooth, i.e. all the way from a first tooth axial face to a second tooth axial face.

The bevel surface 105 may present a cross section, which, when seen in the plane that contains the geometric rotational axis C of the saw blade, is substantially straight.

The bevel surface 105 may be planar as seen in this plane. Hence, the bevel surface 105 may intersect one of the tooth axial faces at a sharp angle $\alpha_C$, i.e. an angle less than 90 degrees, and may intersect the other, opposing, tooth axial face at an obtuse angle, i.e. an angle more than 90 degrees. The sharp angle $\alpha_C$ may be positioned at the axially distal portion of the saw blade, i.e. towards the direction Df to which the tooth 101a has been set.

The sharp angle $\alpha_C$ may also form the radially outermost part of the tooth 101a.

The angle $\alpha_C$ between the bevel surface 105 relative to the axial direction A (i.e. the geometric axis of rotation C) may be 0-70 degrees, preferably 2-40 degrees or 5-30 degrees.

In this embodiment, the hard portion 106 is provided over the entire bevel surface 105, either as a surface hardening, or as a surface coating. That is, the hard portion extends all the way from the first tooth axial face to the second tooth axial face. Moreover, the hard portion forms the radially outermost portion of the tooth.

In the case where the hard portion 106 is provided by means of surface hardening, a thickness of the hardened portion 106 may be 0.05-1 mm, preferably 0.1-0.45 mm or 0.15-0.35 mm.

In the case where the hard portion 106 is provided by means of a surface coating, the thickness of such coating may be 0.001-0.3 mm, preferably 0.1-0.3 mm or 0.1-0.2 mm.

The saw blade illustrated in sectional view in FIG. 5 may, when seen in side view, be designed as illustrated in and described with reference to FIG. 2a or as illustrated in and described with reference to FIG. 6.

The saw blades illustrated above may typically be formed from a planar sheet of steel, which is hardened or unhardened, so as to present hardness of 35-45 HRC, preferably 42-44 HRC. The outer shape of the saw blade may be punched or laser cut and the teeth may be set through bending, optionally assisted by heating.

Hence, the base body 100 and the teeth 101a, 101b are typically formed of the same material and in one piece.

It is noted that different types of saw blades may be used in different applications. For brush cutters, it may be appropriate to use differently designed saw blades for different types of brush cutters.

For example, for ICE driven brush cutters, saw blades having a body thickness T of 1.5-1.8 mm, and preferably 1.5-1.6 mm, is usually employed.

On the other hand, for electrically driven brush cutters, saw blades having a thickness T of 1.1-1.8 mm, and preferably 1.2-1.3 mm, is typically employed.

Moreover, the setting N of the teeth may differ. For ICE driven brush cutters, it may be preferred to use saw blades having teeth set by 0.7-1.4 mm, preferably 0.9-1.3 mm, may be preferred, while for electrically driven brush cutters, saw blades having teeth set by 0.6-1.2 mm, preferably 0.8-0.9 mm may be preferred.

When designing blades according to the disclosure above, it may be preferred to keep the width B of the hard portion 106 according to the measures given herein, while instead allowing the unhardened portion of the outer portion 103 to become thinner when using a thinner blade base body.

The hard portion may be formed hardening the material from which the base body and teeth are formed so as to achieve a hardness of 45-75 HRC, preferably 55-65 HRC. In any event, the hard portion is harder than the base body 100. Laser hardening may be preferred in order to properly control the thickness of the hard portion thus provided.

In the case where the hard surface is formed by surface coating, any type of deposition method may be used, including PVD or sputtering. Coating materials suitable for providing hard abrasion resistant coatings are known as such, including but not limited to TiN, TiCN and TiAlN coatings.

Figure 6:
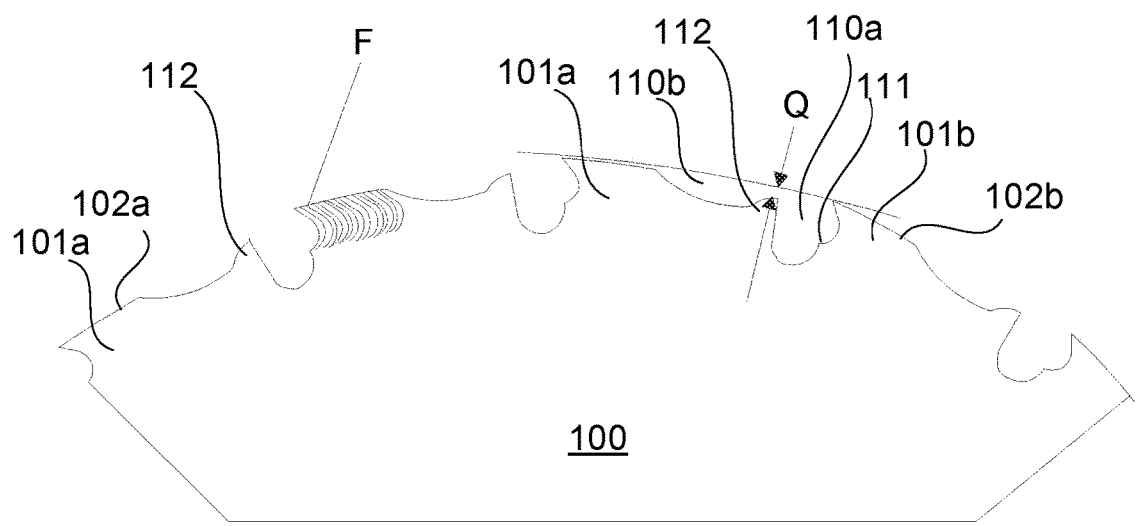
FIG. 6 schematically illustrate a partial side view of a saw blade according to a fourth embodiment.
Figure 7:
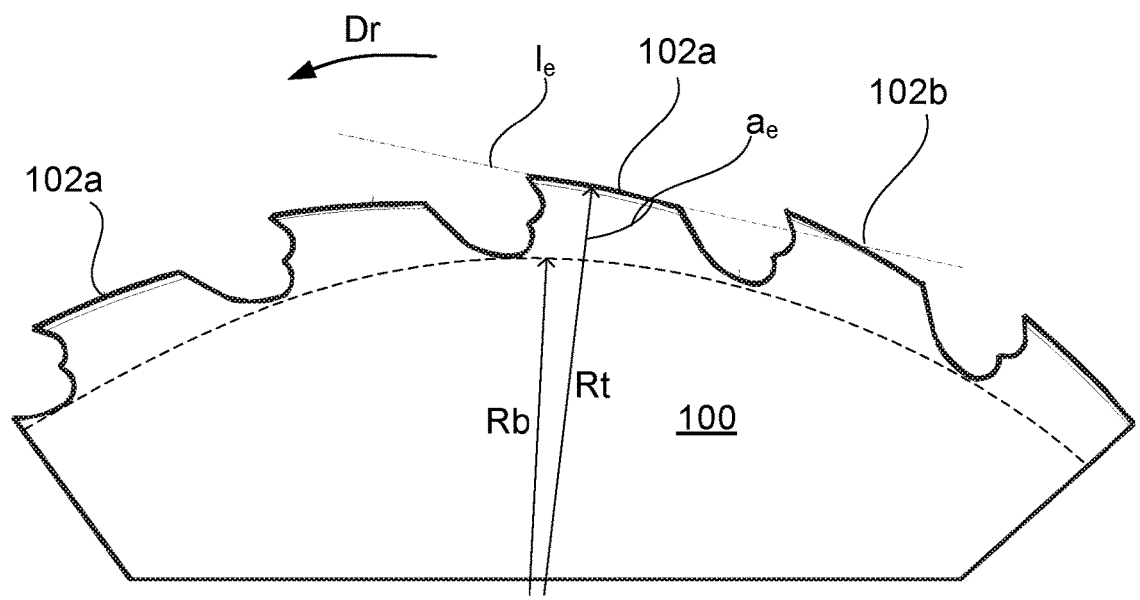
FIG. 7 schematically illustrates a partial side view of a saw blade showing an angle of 4-10 degrees from the cutting edge to the radius.

Referring to FIG. 6, there is illustrated an alternative design of the chip space 110a, 110b, wherein the chip space is divided into two portions 110a, 110b, which are spaced apart in the rotational direction of the saw blade and which are separated by a chip limiter 112.

Hence, a first chip space 110a is formed near the undercut portion of the cutting edge 102a, 102b and the chip breaker 111, as a first radial recess from a circumferential line interconnecting the radially outermost portions of tips of the cutting edges 102a, 102b. The first radial recess also extends radially inwardly from an imaginary circumferential line interconnecting the innermost parts of the cutting edges 102a, 102b.

A second chip space 110b is formed between the chip limiter 112 and the respective innermost part of the respective cutting edge 102a, 102b.

As seen from the chip space 110a, 110b, the chip limiter 112 protrudes outwardly and may be spaced radially inwardly from the imaginary circumferential line interconnecting the radially outermost portions of tips of the cutting edges 102a, 102b by a distance Q of 0.4-1.0 mm, preferably 0.5-0.7 mm. Hence, the radial recesses providing the first and second chip spaces 110a, 110b extend further radially inwardly from the imaginary circumferential line interconnecting the radially outermost portions of tips of the cutting edges 102a, 102b as compared with the chip limiter 112.

Moreover, the chip spaces 110a, 110b may extend radially inwardly by different distances. For example, the first chip space 110a may extend radially inwardly by 1-5 times that of the second chip space 110b, or vice versa. The first chip space 110a may extend radially inwardly by 5-10 times that of the chip limiter 112.

Referring also to FIG. 6, it is illustrated how re-sharpening of the saw blade may be achieved. At reference numeral F in FIG. 6, there is shown how a rounded rasp may be used to re-sharpen the saw blade. The rasp should have greater hardness than the material of the blade base body 100. The rasp is applied to the undercut part of the tooth and typically at an angle of 10-20 degrees to the tooth plane Pt. The rasp is applied on that face of the tooth which faces the opposite direction Db of that towards which the tooth has been set. Hence, a sharp tip is achieved radially outside the undercut portion of the tooth 101a, 101b.

In the case where the tooth has a varying radial extent, as described above, the diameter of the blade will diminish with repeated re-sharpening operations (15-20 re-sharpening operations may be typical for each blade). Consequently, it may be necessary to also reduce the radial extent of the chip limiter 112, e.g. by grinding it.

The invention claimed is:

1. A saw blade, comprising
a generally circular blade base body, and
a plurality of teeth, extending radially from the base body,
wherein the teeth are alternatingly set towards opposing axial directions of the saw blade, such that each tooth presents a respective tooth plane, which is angled relative to a base body plane,
wherein the teeth present a respective first cutting edge, extending along a radially distal edge portion of the respective tooth, along a length of the tooth, as seen in a direction of rotation of the saw blade, and
wherein the radially distal edge portion of the respective tooth presents a first bevel, providing a first bevel surface which is non-perpendicular relative to the tooth plane,
wherein the radially distal edge portion presents, at a radially outermost portion thereof, a hard portion having greater hardness than the base body and
wherein the hard portion extends more than 0.05 mm and less than 1.5 mm radially inwardly from the radially distal edge of the tooth.

2. The saw blade as claimed in claim 1, wherein the hard portion presents a hardness of 45-75 HRC.

3. The saw blade as claimed in claim 1, wherein the hard portion comprises a radially outermost portion of the tooth.

4. The saw blade as claimed in claim 1, wherein the first bevel surface, in a plane comprising a geometric rotational axis of the saw blade, extends at an angle of 0-70 degrees relative to the rotational axis.

5. The saw blade as claimed in claim 1, wherein the hard portion extends over at least 90% of a thickness of the tooth, as seen in the axial direction.

6. The saw blade as claimed in claim 5, wherein the first bevel surface is surface hardened and/or surface coated by a hard material.

7. The saw blade as claimed in claim 5, wherein the hard portion is formed by a hardened material portion, extending to a depth of 0.05-1 mm, as seen in a direction normal of the first bevel surface.

8. The saw blade as claimed in claim 5, wherein the hard portion is formed by a surface coating extending to a thickness of 0.001-0.3 mm, as seen in a direction normal of the first bevel surface.

9. The saw blade as claimed in claim 1, wherein the hard portion has an extent of less than 60%, of a thickness of the tooth, as seen in the axial direction.

10. The saw blade as claimed in claim 9, wherein an extent in the axial direction (A) is 0.1-1.3 mm.

11. The saw blade as claimed in claim 9, wherein the hard portion is formed by a hardened material portion, to a depth of 0.05-1 mm, as seen in the radial direction of the saw blade.

12. The saw blade as claimed in claim 1, wherein the radially distal edge portion presents a second bevel, providing a second bevel surface, which, as seen in said plane comprising the geometric rotational axis of the saw blade, forms an obtuse angle with the first bevel surface.

13. The saw blade as claimed in claim 1, wherein the blade base body presents a thickness of 1.1-1.8 mm.

14. The saw blade as claimed in claim 1, wherein an axially, outermost portion of each tooth is axially set by 0.6-1.4 mm, from a corresponding surface of the base body.

15. The saw blade as claimed in claim 1, wherein the blade base body presents a hardness of 35-45 HRC.

16. The saw blade as claimed in claim 1, wherein the teeth and the blade base body are integrated with each other.

17. The saw blade as claimed claim 1, wherein each pair of adjacent teeth are separated, in the rotational direction of the saw blade, by a chip space.

18. The saw blade as claimed in claim 1, wherein a line between two spaced apart points on each of the cutting edges exhibits an angle which deviates by 4-10 degrees from being perpendicular, relative to a radius of the saw blade, taken at a center of said line.

* * * * *